INVENTOR
PETER BAUER

BY

ATTORNEYS 3,282,562
FLUID ESCAPEMENT MECHANISM

Peter Bauer, Germantown, Md., assignor to Sperry Rand Corporation, New York, N.Y., a corporation of Delaware Filed June 8, 1964, Ser. No. 373,272
20 Claims. (Cl. 253—101)

This invention relates to escapement mechanisms and more particularly, to an escapement mechanism operative on fluid principles.

Escapement mechanisms or, briefly, escapements are well known in the prior art. They find extensive application in time pieces and, in general, serve to rotate a wheel stepwise at regular time intervals. Prior art escapements are mainly operative on mechanical or electromechanical principles. Since fluid devices such as fluid amplifiers have proven themselves to be readily adaptable to digital techniques, data processing equipment has been developed in which the processing functions are carried out in conformance with fluid principles. Whereas electrical digital processing equipment utilizes electrical pulse responsive devices, fluid operated equipment may require the availability of devices operative on fluid pulses.

It is therefore an object of the invention to provide an escapement mechanism operating on fluid principles.

It is a further object of the invention to provide a counter operative on fluid principles.

According to the invention a basic escapement mechanism is provided comprising a step wheel which is acted upon by two alternately applied fluid streams, each fluid stream being disposed to first rotate the step-wheel and then to lock same after rotation through a certain angle. The fluid streams may be outputs of a fluid amplifier.

Figure 1A:
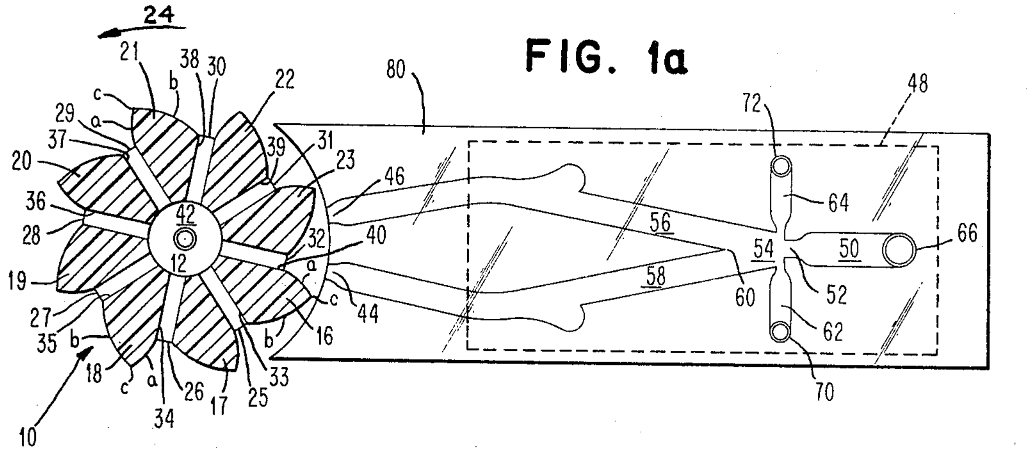
Figure 1B:
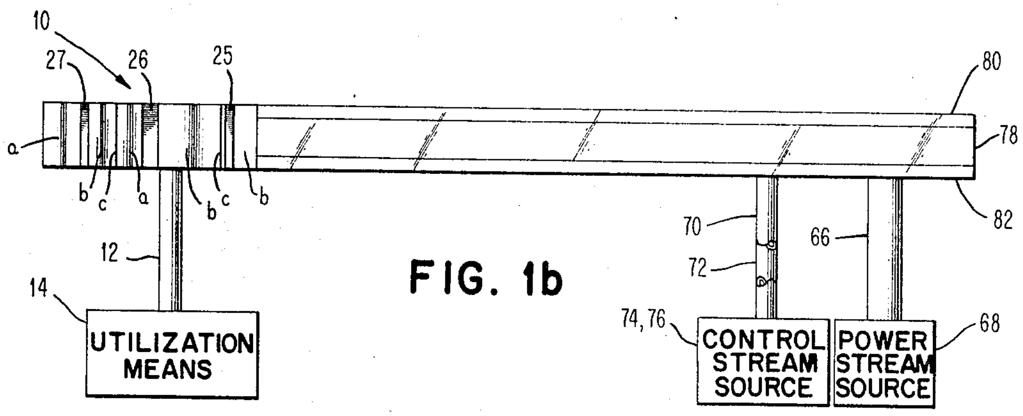
Figure 2A:
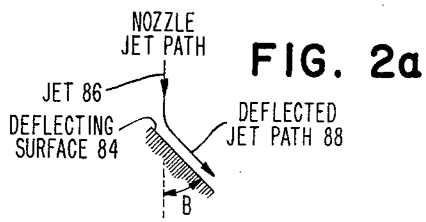
Figure 2B:
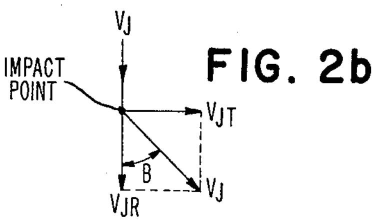
Figure 2C:
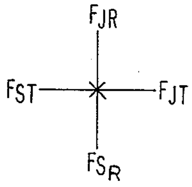
Figure 3:
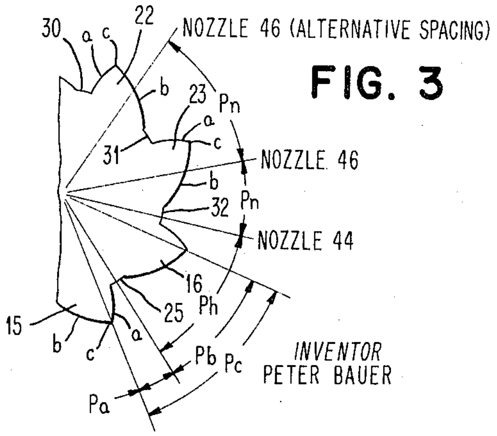
Figure 8:
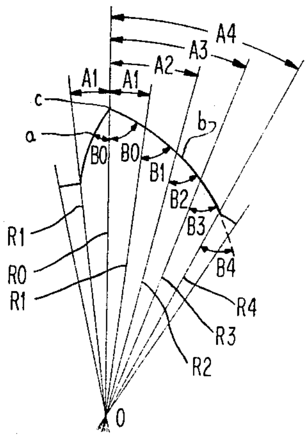
Figure 9:
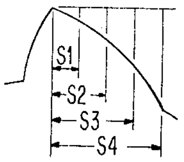
Figures 10, 11:
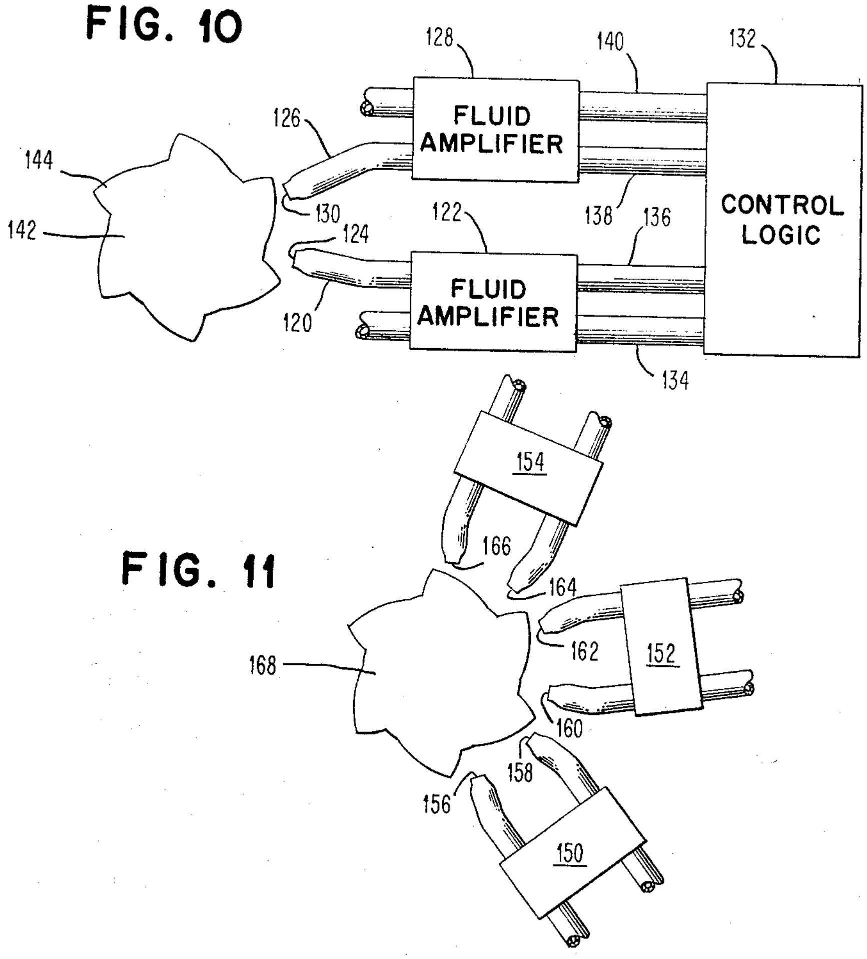

These and other objects of the invention will become apparent during the course of the following description, to be read in view of the drawings, in which:

FIGURES 1*a* and 1*b* respectively show plan and elevation views of one preferred fluid escapement mechanism;

FIGURES 2*a*, 2*b*, and 2*c* are fluid force diagrams;

FIGURE 3 illustrates the criteria governing construction of the fluid escapement wheel;

FIGURES 4, 5, 6*a*, 6*b*, and 7 show alternative constructions of the fluid escapement member;

FIGURES 8 and 9 illustrate further criteria for designing the fluid escapement mechanism; and FIGURES 10 and 11 show alternative system organizations for causing motion of the fluid escapement mechanism.

FIGURES 1*a* and 1*b* respectively show the plan and side elevation views of one preferred escapement mechanism which employs a rotatable wheel 10 operated by means of alternate fluid jets provided by a pure fluid amplifier. Escapement wheel 10 is rotatably supported by a shaft 12 which in turn may be connected to some form of utilization means 14 responsive to the turning of said shaft. Wheel 10 carries thereon a plurality of tooth-like configurations 16 through 23 which are spaced apart along the line of wheel rotation about its axis. In the embodiment shown in FIGURE 1*a*, these tooth-like configurations are comprised of projections extending outwardly from the wheel. Each tooth has front and rear opposed faces *a* and *b* respectively (in relation to the direction of stepwise wheel rotation indicated by arrow 24), joined together at an apex *c* which in turn is asymmetrically located with respect to the bases of said faces *a* and *b* in a manner subsequently to be described. Located between the bases of each adjacent pair of teeth is a fluid receiving hold or aperture indicated by numerals 25 through 32 in FIGURES 1*a* and 1*b*. These fluid receiving or escape holes are connected via interior bores

33–40, respectively, to a center fluid receiving chamber 42 located within wheel 10. Center chamber 42 may be communicated to some fluid reservoir by means of a hollow axle 12 if so desired, or alternatively, certain of the bores 33–40 may be used to allow fluid entering a port on one side of the wheel to escape freely out the opposite side of the wheel. This latter arrangement is particularly adapted to a wheel carrying an even number of teeth, since pairs of the bores can be made diametrically opposed in the case where the spacing between the teeth on the wheel is equal.

FIGURE 1*a* further shows one pair of fluid nozzles 44 and 46 which are located external to the wheel in spaced apart relationship along the line of wheel rotation and oriented so that each nozzle directs a fluid jet stream substantially radially toward the axis of wheel rotation to thereby impinge upon a face of that tooth immediately adjacent the nozzle. In other words, the nozzle orientation is such that a jet emitted therefrom is substantially perpendicular to the curved line of wheel rotation at its point of impact or impingement with a tooth. As will hereafter be described in greater detail, the particular spacing between nozzles 44 and 46 relative to the asymmetrical location of the teeth apexes *c* and receiving holes 25–32 is such that fluid jet streams alternately appearing from said nozzles 44 and 46 will cause stepwise wheel rotation in direction 24.

The preferred embodiment of the basic escapement mechanism employs a pure fluid amplifier 48 for supplying fluid to the nozzles 44 and 46 in proper sequence in order to result in stepwise rotation of wheel 10. A typical pure fluid amplifier is shown in FIGURE 1*a* as being comprised of a power stream input channel 50 which terminates at nozzle 52 in one end wall of a fluid interaction chamber 54, from whose opposite end branch power stream output channels 56 and 58 separated by a divider tip 60. A pair of opposed control stream channels 62 and 64 also enter interaction chamber 54 at substantially a right angle to the flow axis of power stream orifice 52. Relatively high energy power stream fluid is supplied to channel 50 via a conduit 66 from some normally continuously operating source 68. Control stream fluid is selectively applied to channels 62 and 64 via respective conduits 70 and 72 from actuated control stream sources 74 and 76. As is well known in the pure fluid art, the power stream flowing from channel 50 into chamber 54 may be deflected in its entirety to flow out of the amplifier via either channel 56 or 58 without losing its integrity. This deflection is accomplished by providing a fluid signal to an appropriate one of the control stream input channels. For example, in a momentum exchange pure fluid amplifier, fluid applied to control channel 64 issues into chamber 54 as a control jet to there impinge upon a power stream jet issuing from orifice 52. The control jet can have relatively lower energy than the power jet, yet still by virtue of momentum exchange cause the power jet to turn through an angle in chamber 54 so as to flow entirely in output channel 58. Conversely, control stream fluid applied to channel 62 issues as a relatively low energy jet into chamber 54 to there impinge upon the power jet and so deflect the latter into output channel 56. Other pure fluid amplifiers may operate by applying a suction pressure to an appropriate one of the control channels in order to produce a pressure gradient across the power stream which in turn causes its deflection into an appropriate one of the output channels. Furthermore, power stream flow in either one or both of the output channels may be stable after the termination of the control signal fluid. One way to provide such stability is by designing the amplifier so that it exhibits the well-known boundary layer lock-on phenomenon. This phenomenon occurs when the power stream, during its flow through an output channel along the adjacent side wall of chamber 54 entrains fluid between it and said side wall so as to lower the pressure of this region. This self-generates a pressure gradient which maintains power stream deflection even after a control signal disappears. Other types of stable fluid amplifier may be constructed such as those using feedback channels tapped from the output power stream channels in order to maintain control stream fluid impinging upon the power stream. The amplifier channels and nozzles 44 and 46 may be incorporated into a unitary body if so desired which may consist of a center lamination 78 in which the fluid channels are cut or etched together with top and bottom cover plates 80 and 82 for forming the top and bottom walls of the channels. This fabrication gives fluid channels of rectangular cross-sectional flow area which is particularly suitable where large numbers of fluid amplifiers must be incorporated into as small a volume as possible. However, other cross-sectional flow shapes of the fluid channels may be employed.

In general, the operation of the embodiment in FIGURES 1*a* and 1*b* is as follows, with the cycle of events beginning with the wheel 10 at the position indicated. Assume first that control stream source 76 temporarily produces fluid which is applied to control channel 64 so as to deflect the fluid amplifier power stream into output channel 58. This power stream in channel 58 exists via nozzle 44 and follows a radial path toward hole 32 in wheel 10. This hole 32 and its connecting bore 40 are shown to be already aligned with the power stream path so that the fluid from nozzle 44 passes into chamber 42 and mostly through the opposite bore 36 to exit via hole 28 into the ambient environment. However, had wheel 10 been in a slightly deviated position counter-clockwise from that shown in FIGURE 1*a*, said stream from nozzle 44 would have been at least partially blocked by face *a* of tooth 16 thereby preventing its complete passage to opposite hole 28. For this last mentioned position the force of the jet from nozzle 44 acting upon face *a* of tooth 16 would rotate wheel 10 slightly clockwise until hole 32 becomes perfectly aligned with the nozzle 44 jet. Thus, as long as a jet continues to issue from nozzle 44 the wheel 10 is held or bolted in a predetermined angular position by virtue of said jet entering hole 32. This is so since any other unbalanced force externally acting on the wheel which tends to rotate it away from said aligned position would cause the nozzle 44 jet to impinge either upon face *a* of tooth 16 or upon face *b* of tooth 23 to thereby produce a tangential counter force component tending to keep hole 32 in alignment with said jet.

If now control fluid is applied to channel 62 of fluid amplifier 48, the power stream is deflected into output channel 56 so as to cause a fluid jet to issue from nozzle 46 instead of from nozzle 44. When wheel 10 is in the position shown in FIGURE 1*a* at the time that said nozzle 46 jet commences to impinge upon face *b* of tooth 23, a tangential force component is produced which rotates wheel 10 in the counterclockwise direction 24 until hole 32 becomes aligned with the nozzle 46 jet. Said alignment of hole 32 also means that rotation of wheel 10 is such that the radial path of a jet from nozzle 44 would impinge upon face *b* of tooth 16. Consequently, a subsequently applied jet from nozzle 44 after termination of the nozzle 46 jet creates a tangential force component in the counterclockwise direction which thereby rotates wheel 10 until hole 25 becomes aligned with nozzle 44. Said alignment of hole 25 also causes face *b* of tooth 16 to be exposed to the radial path of a jet from nozzle 46. If now the jet from nozzle 44 is once again discontinued and that from nozzle 46 commenced (as by the proper deflection of the fluid amplifier power stream from output channel 58 into output channel 56), another stepwise movement of wheel 10 is made in the counterclockwise direction 24 thus bringing hole 25 into alignment with nozzle 46 and further positioning face *b* of tooth 17 in line with nozzle 44. It is thus observed that alternate switching of the fluid amplifier stream between nozzles 44 and 46 causes a precise angular positioning of wheel 10 such that a fluid stream from the activated nozzle 44 or 46 ingresses into a particular hole between the teeth and through to the diametrically opposed hole to represent a stable position.

FIGURES 2*a*, 2*b*, and 2*c* illustrate how the impingement of a fluid jet upon an appropriately oriented surface creates forces attempting to move said surface. In FIGURE 2*a*, a stationary deflecting surface 84 is assumed to be located in the path 86 of a jet issuing from some externally placed nozzle such as 44 or 46 in FIGURE 1*a*. The angle of impingement B of the fluid jet upon surface 84 is such that the jet itself is assumed to be deflected through angle B away from its original undeflected course as it comes from the nozzle. FIGURE 2*b* shows the direction of jet velocity $v$ both before and after its deflection by surface 84, together with two velocity components $v_{JR}$ and $v_{JT}$ resulting from this deflection. Since the particular embodiment of FIGURE 1*a* is now under consideration, said velocity components $v_{JR}$ and $v_{JT}$ have been respectively oriented relative to the radial and tangential coordinates of wheel 10. Thus, assuming that the absolute magnitude of velocity remains the same both before and after deflection because of a frictionless deflecting surface, it is seen that a radial velocity component $v_{JR}$ and a tangential velocity component $v_{JT}$ may be resolved from the deflected velocity direction which now moves in a path at an angle B degrees from the original undeflected path. After impact, the radial velocity component $v_{JR}$ (and hence the momentum) of the deflected jet is less than the magnitude of the original velocity $v_J$ of the undeflected jet, with $v_{JR}$ being equal to $v_J$ cos B. This means that the deflecting surface 84 must apply an upward radial force $F_{SR}$ being equal to the mass of fluid flowing times the change of velocity of fluid in the direction of the undeflected jet. Therefore, by the well known principles of fluid mechanics, the force exerted by the surface in the radial direction away from the center of wheel 42 is given by Formula 1 below:

$$(1)\qquad F_{SR}=\frac{Ws}{g}(v_J-v\quad)=\frac{Ws}{g}(v_J-v_J\cos B)$$

where $Ws$ = the actual weight rate of flow (lb. per sec.); and $g$ = the local acceleration of gravity (f.p.s.$^2$).

It is also observed from FIGURE 2*b* that the jet deflection produces a tangential velocity component $v_{JT}$ which is equal to $v_J$ sin B. Since the original undeflected jet from the nozzles had no tangential velocity whatsoever, there has been a change in momentum in the tangential direction which in turn implies that surface 84 must apply a force $F_{ST}$ in the FIGURE 2*c* in order to create momentum in this direction. This force $F_{ST}$ may be calculated from Formula 2 given below:

$$(2)\qquad F_{ST}=\frac{Ws}{g}(v_{JT})=\frac{Ws}{g}(v_J\sin B)$$

Since surface 84 has been assumed above to be stationary, the forces $F_{SR}$ and $F_{ST}$ applied to the jet must be completely balanced by forces applied by the jet to the surface. Thus, it is seen that the jet must apply a force $F_{JR}$ to surface 84 which is of the same magnitude as force $F_{SR}$ but in the opposite direction, and must further apply a tangential force $F_{JT}$ which is of the same magnitude but in the opposite direction to force $F_{ST}$ applied by the surface to the jet. Consequently, it is seen how the jet deflection will apply force $F_{JT}$ to the deflecting surface. In the case of FIGURE 1*a*, the faces *a* and *b* of the teeth are not immovable since they are carried by a member 10 rotatably mounted about axis 42. Thus, the tangential force $F_{JT}$ applied by a jet to a face *b* of any tooth upon which it impinges will be sufficient to rotate wheel 10 in a counterclockwise direction 24, while a jet impinging upon face *a* of any tooth will cause a tangential force to be applied which will rotate wheel 10 in the clockwise direction.

Figure 4:
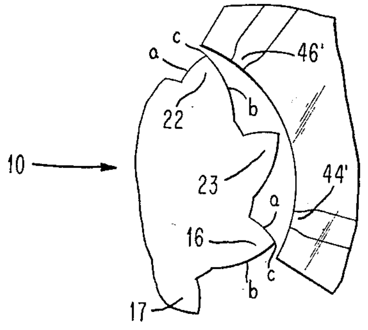

FIGURE 3 illustrates the criteria governing the spacing between the nozzles 44 and 46 relative to the pitch or spacing between the wheel teeth and also to the asymmetrical shape of each. FIGURE 1*a* shows wheel 10 carrying identically shaped tooth-like configurations which are evenly spaced about its periphery. This means that corresponding points on adjacent teeth are equally spaced apart a distance or pitch $P_c$ which is illustrated in FIGURE 3 to specifically be between apexes *c* of adjacent teeth. Thus, in FIGURE 3 each distance $P_c$ is of equal value to correspond with the embodiment shown in FIGURE 1*a*. Furthermore, the fluid receiving holes 25–32 in FIGURE 1*a* are also considered to be equally spaced apart such that the pitch $P_h$ between adjacent holes is the same all around the wheel and is also equal to the pitch $P_c$ between corresponding points on adjacent teeth. Other distances of interest are $P_a$ measured between the apex *c* of each tooth and the centerline of the hole adjacent the base of its front face *a*, and distance $P_b$ measured between apex *c* and centerline of the fluid receiving hole adjacent the base of its rear face *b*. In both cases, these distances $P_a$ and $P_b$ are measured along the line of member motion as shown in FIGURE 3. Furthermore, it is seen that the sum of $P_a$ and $P_b$ is equal to $P_c$ and also to $P_h$ in the case where the teeth are equally spaced apart one from another. However, it should further be observed that for each tooth the distance $P_a$ is less than the distance $P_b$ in order that apex *c* of the tooth be asymmetrically located with respect to the bases of its front and rear sides *a* and *b*, respectively. The reason for this requirement is that a stepwise movement of the wheel is desired in but one predetermined direction when fluid jet streams alternately appear from nozzles 44 and 46. In turn this means that whenever a fluid receiving hole in the wheel is directly aligned with the jet stream appearing from either nozzle, a face *b* of some tooth on the wheel must be in line with the jet flow path of the other unactivated nozzle. For example, in FIGURE 3 it is seen that a fluid receiving hole 32 is directly in line with the flow path of nozzle 44, while rear face *b* of tooth 23 is in line with the flow path from nozzle 46. In like fashion, if any other fluid receiving hole, such as 33, on wheel 10 were in line with nozzle 44, then the rear face *b* of tooth 16 should be in line with the flow path from nozzle 46. Conversely, if hole 32 were instead brought in alignment with the flow path from nozzle 46, then face *b* of tooth 16 should be in line with the flow path from nozzle 44. Furthermore, if it is desired to have an equal step increment for each alternate pulsing of the nozzles 44 and 46, then the spacing $P_n$ between nozzles 46 and 44 should be one-half of either the pitch $P_h$ or ($P_c$) or a multiple thereof. Nozzle 46 also may be spaced anywhere around wheel 10 as, for example, is shown by the alternative location thereof in FIGURE 3, just so long as the criteria is met of having its flow path impinging upon a face *b* of some tooth whenever a fluid escape hole is aligned with nozzle 44, and vice versa. FIGURE 4 also shows this alternate nozzle spacing when using the wheel 10 and fluid amplifier 48 of FIGURE 1*a*.

The above criteria may be conveniently expressed in mathematical language by the following Formulas 3 and 4. These formulas assume that both the teeth and fluid receiving holes on a wheel are evenly spaced apart such that all values $P_c$ and $P_h$ are equal to the same value P. This means also that all values $P_a$ are equal to one another, and all values $P_b$ are equal to one another.

(3) $$Pa<Pb$$

(4) $$mP+Pa<Pn<mP+Pb$$

where *m* can be any positive integer including zero.

As a specific example of Formula 4, assume that the parameter *m* is equal to zero such that Formula 4 reduces to $P_a<P_n<P_b$. This equation represents the case of FIGURE 1*a* wherein nozzles 44 and 46 are spaced apart a distance $P_n$ which is less than the spacing between corresponding points on adjacent teeth, but large enough so that a stepwise movement results. On the other hand, where the value *m* in Formula 4 is equal to 1, then Formula 4 becomes $P+P_a<P_n<P+P_b$ which describes the configuration of FIGURE 4 wherein nozzle 46 has the alternative spacing shown in FIGURE 3. For the case of wheel 10 shown in FIGURE 1*a*, which has eight teeth and eight fluid receiving holes spaced about its periphery, *m* could have as high a value as seven which would place nozzle 46 on the opposite side of nozzle 44 such that face *b* of tooth 16 would be in line with the nozzle 46 flow path whenever fluid receiving hole 32 is aligned with nozzle 44. Obviously then, the largest magnitude of value *m* depends upon the the number of teeth carried by the moving member.

Where it is desired to design the escapement such that the wheel steps one-half of a tooth space $P_c$ for each jet pulse emanating from nozzle 44 or 46, then Formula 5 below gives the necessary spacing $P_n$ between nozzles.

(5) $$P_n=P(m+\tfrac{1}{2})$$

where *m* can be any positive integer including zero.

Figure 5:
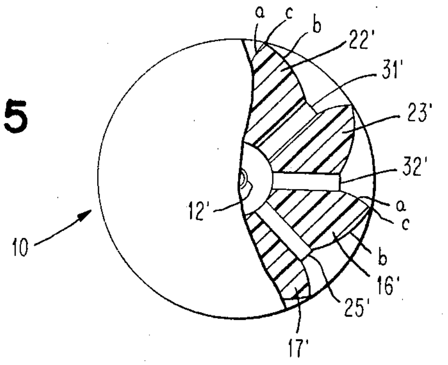
Figure 6A:
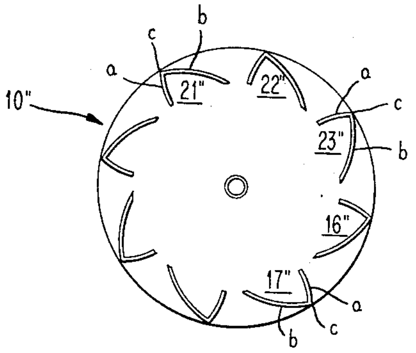
Figure 6B:
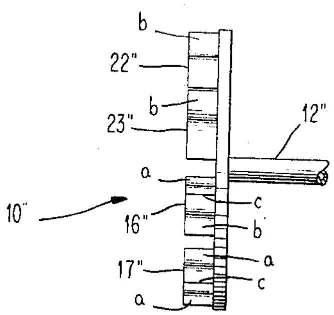
Figure 7:
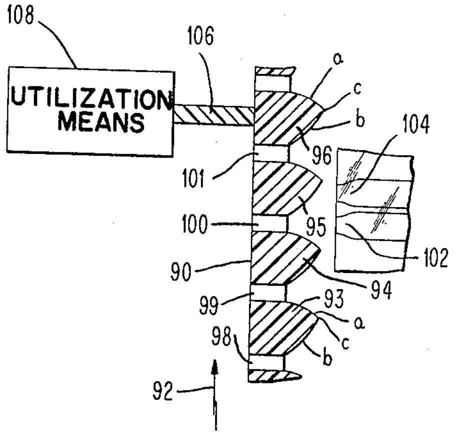

As additional embodiments of the basic escapement, the tooth-like configurations may in fact be depressions in the wheel inwardly extending from its periphery as shown in FIGURE 5 which employs primed numbers for elements corresponding to elements in FIGURE 1*a*. Or, the teeth-like configurations may be disposed perpendicularly to the face of the wheel as shown in FIGURES 6*a* and 6*b*.

FIGURES 1, 4, 5 and 6 described above have shown escapement actions wherein the teeth carrying member is mounted for motion along a curvilinear line of motion, more particularly in a circle about a center axis. The principles of the present invention may also be embodied in the structure shown in FIGURE 7 wherein the tooth-carrying member 90 is a rack mounted for rectilinear motion at least in the direction of arrow 92. Rack 90 contains a plurality of teeth 93, 94 etc. each having a front face *a* and a rear face *b* which are joined together at an apex *c* asymmetrically disposed with respect to the tooth bases. Fluid receiving holes 98 etc. are located one between each adjacent pair of teeth so as to permit the bolting of rack 90 whenever one such hole is directly in line with a fluid jet appearing from either of the nozzles 102 or 104. Where the fluid utilized is air and rack 90 is situated in the atmosphere, then holes 98 etc. may extend through to the other side of rack 90 so as to permit the free egress of the air jet into the atmosphere environment. The spacing between nozzles 102 and 104 relative to the shape of the teeth is governed by the same principles discussed in connection with FIGURE 3. It should further be noted in FIGURE 7 that said nozzles 102 and 104 are oriented such that the jet flow path from each is essentially perpendicular to the rectilinear line of motion of member 90. The motion and/or position of member 90 may be conveyed by connecting link 106 to any form of utilization means 108. For example, arm 106 might carry a gear rack at its end which rotates a meshed gear wheel for any one of a number of purposes.

Among the novel features of the present fluid escapement, whether rotatable or otherwise, is the particular contour employed for at least the rear face *b* of each tooth in order to create a restoring tangential force which decreases with a decrease in the amount or degree of displacement from a stable position of the movable member. This feature permits maximum torque to be applied to the wheel when a jet is first initiated so as to reduce the time required for step wise rotation (i.e., increases the response time of the escapement), yet prevents or at least reduces overshoot of the wheel past its next stable position which in turn would create undesirable hunting. It will be noted both in FIGURES 1*a*, 4 and 7 that each of the faces *a* and *b* of a tooth has a generally convex profile as viewed from outside the movable member. By forming said convex surface according to the principles next to be described, the angle of jet impingement upon different points of a tooth face creates different tangential force values $F_{JT}$ which generally increase the closer the point of impingement to the tooth apex. Reference is now made to FIGURE 8 of the drawings which shows a single tooth carried on a rotatable member such as wheel 10 of FIGURE 1*a*. This configuration shows the front face *a* and the rear face *b* each of which is curved such that the angle B, made between any point on its surface with the radius to that point, increases the closer said point is to apex *c*. For example, the radius R0 has been drawn from the origin O (i.e., from the axis of wheel 10 in FIGURE 1*a*) to the apex *c* of the tooth, while other radii R1, R2, R3 and R4 have been drawn from the origin O to various other points on face *b*. These last four radii are spaced apart from R0 by respective angles A1, A2, A3 and A4. Angles B0, B1, B2, B3 and B4 are therefore made between these respective radii and the points on face *b* to which the respective radii extend. By Formula 2 given above, it is seen that the tangential force $F_{ST}$ applied to a tooth face by the impingement therein of a fluid jet is governed by the angle B. Consequently, the bigger the angle B, the bigger will be the tangential $F_{ST}$ which in turn increases the torque tending to rotate wheel 10. Torque is also dependent upon the distance R from the center of rotation at which the force is applied. The surface of face *b* of the tooth in FIGURE 8 is so formed that angle B0 made between radius R0 and face *b* is the largest angle made between said face *b* and any of the other radii. Angle B1 in turn is larger than any of the angles B2, B3 or B4, while angle B2 is larger than B3 is larger than B4. Face *a* of each tooth may also be formed in convex shape so that it too provides a greater angle of impingement the further the point of impingement is away from a fluid escape hole. Each face of the tooth may further be designed that there is an equal change in the angle B per degree of wheel displacement from apex *c*, or alternatively may be formed with unequal changes per degree of displacement. Furthermore, it is also possible to design each face of the tooth such that angle B remains the same for the entire wheel displacement between apex *c* and the fluid receiving hole such that force $F_{ST}$ remains constant at each point of impingement on the tooth. Such a configuration is still advantageous since the torque $(F_{ST} \times R)$ diminishes as the fluid escape hole approaches alignment with the actuated jet.

FIGURE 9 illustrates how the teeth on a rectilinear motion body may also be formed with convex faces, as viewed from without, so as to cause a diminishing of the longitudinal restoring force as a stable position of the member is approached. It will further be appreciated here that a perfectly straight surface *a* or *b* on a rectilinearly moving body will cause the longitudinal force to remain constant throughout the entire face impingement area since the angle B made between a perpendicular (the path of the nozzle jet) and the face at the point of impact would remain constant.

As an alternative embodiment of the FIGURE 1 configuration, FIGURE 10 shows an arrangement wherein one power stream output channel 120 of a first fluid amplifier 122 may be used to supply fluid to a nozzle orifice 124, while one power stream output channel 126 of a second pure fluid amplifier 128 is used to supply fluid to a second nozzle orifice 130. Control logic arrangements represented merely as a block diagram 132 control the pulsing sequence in nozzles 124 and 130 by virtue of the selected application of control stream fluid to said fluid amplifiers 122 and 128 via their respective control stream input channels 134, 136, 138 and 140. Consequently, an escapement wheel 142 carrying a plurality of tooth-like configurations 144 may be energized by more complicated circuitry than disclosed in FIGURE 1.

FIGURE 11 shows still another arrangement employing a novel escapement action wherein a plurality of individual fluid amplifiers 150, 152 and 154 each controls the alternate pulsing of a pair of escapement nozzles individual thereto as for example pairs 156–158, 160–162, and 164–166. Each pair of nozzles are spaced apart according to the principles previously described and are oriented such that fluid streams therefrom impinge at different radial directions upon the teeth carried by escapement wheel 168. Consequently, said wheel 168 may be rotated by the selective actuation of any one of said fluid amplifiers whenever it is controlled so as to alternately emit power jet streams from its associated pair of nozzles. Consequently, FIGURE 11 is an example of apparatus wherein pulses from several different sources may be added together since the stepwise movement of the wheel occurs for each complete cycle of pulse generation from a source.

Alternatively, wheel 168 rotation can be taken as an indication of a logical OR function which occurs whenever any one of the pulse sources 150, 152, 154 is actuated. Therefore, the wheel basically acts as a counter multiplying pulses or actually counting pulses by appropriate arrangements of the teeth and the corresponding jet nozzles. Furthermore, in a slightly different position of nozzle arrangement, said wheel may act so as to add or subtract depending upon which nozzles are to be activated.

While certain preferred embodiments of the present invention have been shown and/or described, various modifications thereto will be apparent to those skilled in the art without departing from the novel principles of the invention as defined in the appended claims.

The embodiments of the invention in which an exclusive property or privilege is claimed are defined as follows:

1. An escapement mechanism comprising: a member mounted for motion in at least one predetermined direction and carrying a plurality of tooth-like configurations spaced apart along its line of motion, with each tooth-like configuration having first and second opposed faces joined together at an apex asymmetrically located with respect to the bases of said faces such that the force of a fluid jet stream perpendicularly oriented to said line of member motion at any point of impingement on at least one predetermined face of the tooth-like configuration is resolved into at least one force component which is parallel to said one predetermined direction so as to cause motion of said member therein; a plurality of fluid receiving holes located one between the side bases of each adjacent pair of tooth-like configurations for receiving a perpendicularly oriented fluid jet stream when directly aligned therewith in order to arrest member motion; and at least one pair of fluid nozzles spaced apart along the line of member motion, with each nozzle being oriented to direct a fluid jet stream substantially perpendicular to said line of motion so as to impinge upon said plurality of teeth, with the spacing between said nozzles relative to the asymmetrical location of said teeth apexes and said receiving holes being such that a fluid jet stream alternately appearing from said nozzles will cause stepwise member motion in said one predetermined direction.

2. The device according to claim 1 wherein said member is mounted to have curvilinear motion in the region of impingement with said jet streams.

3. The device according to claim 1 wherein said member is a rotatable wheel, and each of said pair of nozzles is substantially radially oriented with respect to the axis of wheel rotation.

4. The device according to claim 1 wherein said member is mounted to have rectilinear motion in the region of impingement with said jet streams.

5. The device according to claim 1 wherein said tooth-like configurations are formed by projections extending outwardly from said member.

6. The device according to claim 1 wherein said tooth-like configurations are formed by depressions in said member.

7. The device according to claim 1 wherein said opposed faces of each tooth-like configuration are of unequal length between base and apex.

8. The device according to claim 1 wherein at least said one predetermined face of each tooth-like configuration is smoothly curved in a convex manner as viewed from without said member.

9. The device according to claim 1 wherein the spacing between apexes of each adjacent pair of tooth-like configurations is at least equal to some predetermined minimum value, and the spacing between said pair of nozzles is such that the distance between the fluid jet paths therefrom at the region of tooth impingement is less than said minimum value.

10. An escapement mechanism comprising: a member mounted for motion in at least one predetermined direction and carrying a plurality of tooth-like configurations spaced apart along its line of motion, with each tooth-like configuration having first and second opposed faces joined together at an apex asymmetrically located with respect to the bases of said faces, wherein at least one predetermined face of each tooth-like configuration is shaped such that the angle of impingement thereon by a fluid jet stream perpendicularly oriented to said line of member motion is at least as large at points nearer to said apex as it is at points nearer to said base in order that the force of said jet stream can be resolved into at least one force component which is parallel to said one predetermined direction so as to cause motion of said member therein; a plurality of fluid receiving holes located one between the side bases of each adjacent pair of tooth-like configurations for receiving a perpendicularly oriented fluid jet stream when directly aligned therewith in order to arrest member motion; and at least one pair of fluid nozzles spaced apart along the line of member motion, with each nozzle being oriented to direct a fluid jet stream substantially perpendicular to said line of motion so as to impinge upon said plurality of teeth, with the spacing between said nozzles relative to the asymmetrical location of said teeth apexes and said receiving holes being such that a fluid jet stream alternately appearing from said nozzles will cause stepwise member motion in said one predetermined direction.

11. The device according to claim 10 wherein at least said one predetermined face of each tooth-like configuration is shaped such that the angle of impingement thereupon by said fluid jet stream is larger at points nearer to said apex than at points nearer to said base in order that said parallel force component is greater the further away the point of jet stream impingement from said tooth base.

12. An escapement mechanism comprising: a member mounted for motion in either one of two opposed directions and carrying a plurality of tooth-like configurations spaced apart along its line of motion, with each tooth-like configuration having first and second opposed faces joined together at an apex asymmetrically located with respect to the bases of said faces such that the force of a fluid jet stream perpendicularly oriented to said line of member motion at any point of impingement on either face of the tooth is resolved into at least one force component which is parallel to one of said directions at said point of impingement on one of said faces and is parallel to the other direction at said point of impingement on the other of said faces; a plurality of fluid receiving holes located one between the side bases of each adjacent pair of tooth-like configurations for receiving a perpendicularly oriented fluid jet stream when directly aligned therewith in order to arrest member motion; and at least one pair of fluid nozzles spaced apart along the line of member motion, with each nozzle being oriented to direct a fluid jet stream substantially perpendicular to said line of motion so as to impinge upon said plurality of teeth, with the spacing between said nozzles relative to the asymmetrical location of said teeth apexes and said receiving holes being such that a fluid jet stream alternately appearing from said nozzles will cause stepwise member motion in one of said directions.

13. The device according to claim 12 wherein at least one face of each tooth-like configuration is shaped such that the angle of impingement thereon by said fluid jet stream is at least as large at points nearer to said apex as it is at points nearer to said base.

14. The device according to claim 12 wherein at least one predetermined face of each tooth-like configuration is shaped such that the angle of impingement thereon by said fluid jet stream is larger at points nearer to said apex than at points nearer to said base in order that said parallel force component is greater the further away the point of jet stream impingement on said tooth base.

15. An escapement mechanism comprising: a member mounted for motion in at least one predetermined direction and carrying along its line of motion a row of identical tooth-like configurations whose corresponding points are equally spaced apart a first distance from one another, with a plurality of fluid receiving apertures located one between each adjacent pair of tooth-like configurations and whose corresponding points are likewise equally spaced said first distance from one another, where each tooth-like configuration has front and rear faces relative to said one predetermined direction of motion which are joined together at an apex which in turn is located a second distance along the line of member motion from the center of the fluid receiving hole adjacent the base of its front face, and a third distance along the line of member motion from the center of the fluid receiving hole adjacent the base of its rear face, where said second distance is less than said third distance, and with at least the rear face of each tooth-like configuration being shaped such that the force of a fluid jet stream perpendicularly oriented to said line of member motion at any point of impingement thereon is resolved into at least one force component which is parallel to said one predetermined direction so as to cause motion of said member in said one predetermined direction; at least one pair of fluid nozzles spaced apart along the line of member motion, with each nozzle being oriented to direct a fluid jet stream substantially perpendicular to said line of member motion so as to impinge upon said plurality of teeth, with the spacing between said nozzles being such that a fourth distance measured in said one predetermined direction between the fluid jet paths therefrom at the region of tooth impingement is greater than the sum of said second distance and any multiple, including zero, of said first distance, but less than the sum of said third distance and any multiple, including zero, of said first distance; and means to selectively apply fluid to said nozzle pair such that fluid jet streams alternately appear from said nozzles so as to cause stepwise member motion in said one predetermined direction.

16. The device according to claim 15 wherein said fourth distance is equal to the sum of one-half said first distance and any multiple, including zero, of said first distance.

17. The device according to claim 15 wherein said last mentioned means comprises at least one pure fluid amplifier.

18. The device according to claim 1 wherein is further included means to alternately apply fluid to each nozzle of said pair.

19. The device according to claim 18 wherein said last mentioned means comprises at least one pure fluid amplifier.

20. The device according to claim 19 wherein one nozzle of said pair is connected to one power stream output channel of a pure fluid amplifier, and the other nozzle of said pair is connected to a second power stream output channel of said pure fluid amplifier.

No references cited.

MARTIN P. SCHWADRON, *Primary Examiner.*

EVERETT A. POWELL, *Assistant Examiner.*